United States Patent
Mc Kee et al.

(10) Patent No.: US 7,601,777 B2
(45) Date of Patent: Oct. 13, 2009

(54) METHOD FOR THE PRODUCTION OF AN AQUEOUS POLYMER DISPERSION

(75) Inventors: Graham Edmund Mc Kee, Neustadt (DE); Gerrit Luinstra, Mannheim (DE); Joachim Queisser, Mannheim (DE); Markus Schmid, Deidesheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 544 days.

(21) Appl. No.: 10/516,135

(22) PCT Filed: Jun. 18, 2003

(86) PCT No.: PCT/EP03/06406

§ 371 (c)(1),
(2), (4) Date: Nov. 30, 2004

(87) PCT Pub. No.: WO04/000917

PCT Pub. Date: Dec. 31, 2003

(65) Prior Publication Data

US 2005/0176875 A1 Aug. 11, 2005

(30) Foreign Application Priority Data

Jun. 21, 2002 (DE) ............................. 102 27 901
Jun. 28, 2002 (DE) ............................. 102 40 188

(51) Int. Cl.
- *C08L 53/00* (2006.01)
- *C08L 15/00* (2006.01)
- *B32B 7/12* (2006.01)
- *B32B 7/10* (2006.01)

(52) U.S. Cl. .............. 524/502; 524/505; 524/167; 524/522; 524/523; 524/528; 260/29.6; 428/364

(58) Field of Classification Search .............. 524/502, 524/505, 167, 522, 523, 528; 260/29.6; 428/310, 428/407

See application file for complete search history.

(56) References Cited

U.S. PATENT DOCUMENTS

| | | | | |
|---|---|---|---|---|
| 2,977,349 A * | 3/1961 | Brockway et al. | ............ | 526/128 |
| 3,066,085 A * | 11/1962 | Smith et al. | ................. | 522/116 |
| 3,360,599 A * | 12/1967 | Bailey et al. | ................ | 264/216 |
| 3,485,894 A * | 12/1969 | Porter | ........................ | 525/193 |
| 3,642,676 A * | 2/1972 | Saunders et al. | ............ | 523/339 |
| 3,879,324 A * | 4/1975 | Timmons et al. | ............ | 523/402 |
| 3,901,954 A * | 8/1975 | Alberts et al. | ............... | 525/296 |
| 4,385,164 A * | 5/1983 | Sinclair et al. | .............. | 526/201 |
| 6,028,135 A | 2/2000 | Keller et al. | | |
| 6,323,279 B1 * | 11/2001 | Guntherberg et al. | ......... | 525/70 |
| 6,521,696 B2 * | 2/2003 | Oates et al. | ................. | 524/505 |
| 6,630,239 B2 * | 10/2003 | Cernohous et al. | ...... | 428/355 R |
| 2004/0230019 A1 * | 11/2004 | Brandenburg | ............... | 526/266 |

FOREIGN PATENT DOCUMENTS

| | | |
|---|---|---|
| DE | 198 21 746 | 11/1998 |
| WO | 99 36444 | 7/1999 |

OTHER PUBLICATIONS

"Aldrich Advancing Science", p. 501, 2005.*
Dispersant/Compatibilizer—Dow Chemical, website.*
"Principles of Polymerization", 4th Edition, George Odian, Chapter 3, p. 297.*

* cited by examiner

*Primary Examiner*—Duane Smith
*Assistant Examiner*—Ives Wu
(74) *Attorney, Agent, or Firm*—Oblon, Spivak, McClelland, Maier & Neustadt, L.L.P.

(57) ABSTRACT

Disclosed is a method for producing an aqueous polymer dispersion, according to which unsaturated monomers are first polymerized by means of suitable catalysts, whereupon the obtained polymers that are swelled with all or some of the remaining unreacted monomers are added to surface-active substances and water in a last step in which the obtained polymers are not entirely separated from the remaining monomers.

16 Claims, No Drawings

METHOD FOR THE PRODUCTION OF AN AQUEOUS POLYMER DISPERSION

The present invention relates to a process for preparing an aqueous polymer dispersion in which unsaturated monomers are firstly subjected to a polymerization in the presence of suitable catalysts, wherein the polymers obtained in this way which are swollen with the total amount or part of the unreacted residual monomers are then admixed with surface-active substances and water in a final step, with the polymers obtained not being separated completely from the residual monomers even in the final step.

The present invention further provides an aqueous polymer dispersion which is obtained by the process of the present invention and provides for its use in various applications.

In the preparation of aqueous polymer dispersions, difficulties are frequently encountered when shear forces have to act on the mixture of water, polymer and emulsifier in order to disperse the viscous polymer in water and to obtain small particle sizes of the polymer dispersions. Particularly in the case of polymers of aliphatic olefins, considerable problems are observed in dispersing them in water, and these problems can be attributed, inter alia, to the high viscosity of the polyolefins.

In Am. Chem. Soc., Div. Polymer Chemistry, 1977, 38 (2), pages 630 and 631, Eckersley et al disclose a process for preparing dispersions of polyolefins in water, in which the polymer particles are firstly dissolved in a solvent and subsequently emulsified in water. In this process it is necessary, inter alia, to remove the unpolymerized residual monomers after the preparation of the polyolefin and likewise separate off the solvent used after the dispersion step. The isolation of the polyolefins followed by a further additional dispersion step is complicated and associated with additional costs.

Furthermore, DE-A 19821746 describes a process for preparing dispersions of grafted rubber in water. Here, rubbers comprising copolymers of ethylene with other α-olefins and dicyclopentadienes are firstly cut into small pieces onto which other monomers are then grafted after they have previously been suspended in water. Suspension in water is achieved with the aid of a stirrer which is not able to disperse the rubber particles. These are then firstly swollen in other monomers, in particular styrene, and these other monomers are finally grafted onto them. DE-A 19821746 indicates neither how aqueous dispersions of such polymers can be prepared nor how very small dispersed polymer particles are obtained. In addition, the process described there is technically rather complicated It is an object of the present invention to remedy the above-mentioned disadvantages and to develop a new process for preparing an aqueous polymer dispersion by means of which the latter can be obtained without great expense and which also makes it possible to provide polymer dispersions having a small particle size.

We have found that this object is achieved by the process defined at the outset for preparing an aqueous polymer dispersion. Furthermore, a novel aqueous polymer dispersion has been developed. In addition, the present invention also extends to the use of the aqueous dispersion for paper applications, surface coatings, adhesives raw materials, molded foams, coatings for the back of carpets or pharmaceutical applications. The polymer dispersion, which is likewise provided by the present invention, can also be used in polymer blends, for example as impact modifier.

Preferred embodiments are described, inter alia, in the subordinate claims.

In the process of the present invention for preparing an aqueous polymer dispersion from unsaturated monomers, the latter are firstly subjected to a polymerization in the presence of suitable catalysts.

Catalysts which are suitable for this purpose are the industrially known catalysts for preparing polyolefins, essentially heterogeneous or homogeneous catalysts which may also be supported.

Among the heterogeneous catalysts for the polymerization of the unsaturated monomers, mention may be made of, inter alia, Ziegler catalysts, Ziegler-Natta catalysts and Phillips catalysts. Ziegler catalysts comprise a titanium-containing solid component a) together with cocatalysts in the form of organic aluminum compounds b) as active constituents. Ziegler-Natta catalysts further comprise electron donor compounds c), in particular aliphatic silane compounds, as stereomodifiers in addition to the components a) and b). Phillips catalysts, which are used particularly for the polymerization of ethylene, are based essentially on chromium(VI) oxides applied to silica gel.

Suitable homogeneous catalysts are, in particular, orqanometallic compounds of transition metals of groups 7 to 10 of the Period Table which may also be bridged and can be used together with cocatalysts, as a result of which uncharged or cationic active compounds are finally formed.

Such homogeneous catalyst systems are known from, inter alia, M. K. Leclerc, R. M. Waymouth, Angew. Chem. Int. Ed. Engl. 1998, 37, page 922 ff or W. Spalek, F. Küber, A. Winter, J. Rohrmann, B. Bachmann, M. Aulberg, V. Dolle, E. F. Paulus, Organometallics, 1994, 13, page 954 ff or Soga, Chemical Reviews 2000, Volume 100, No. 4.

In one embodiment of the process of the present invention, organic metal compounds comprising a tridentate chelating bisimine ligand can be used as catalysts for the polymerization of the unsaturated monomers. These compounds and their preparation are described, for example, in WO 01/07491, whose teachings are hereby expressly incorporated by reference at this point, and the documents cited therein. These organic metal compounds have a tridentate chelating bisimine ligand as a major structural element. These tridentate ligands can be obtained, for example, from 2,6-diacetylpyridine by reaction with primary amines such as 2,6-dibromoaniline, 2,6-dichloroaniline, 2,6-dibromo-4-methylphenylamine or 2,6-dichloro-4-methylphenylamine (cf. J. Org. Chem. 1967, 32, 3246).

Preferred organic metal compounds comprising a tridentate chelating bisimine ligand are:

2,6-bis[1-(2,6-dichlorophenylimino)ethyl]pyridineiron(II) chloride, 2,6-bis[1-(2,6-dichloro-4-methylphenylimino)ethyl]pyridineiron-(II) chloride, 2,6-bis[1-(2,6-dibromophenylimino)ethyl]pyridineiron(II) chloride, 2,6-bis[1-(2,6-dibromo-4-methylphenylimino)ethyl]pyridineiron(II) chloride or a corresponding iron(II) bromide or cobalt(II) chloride complex.

In a further embodiment of the process of the present invention, diiminepalladium complexes can be used as catalysts for the polymerization of the olefin rubber. These compounds and their preparation are described, for example, in WO 00/77060, whose teachings are hereby expressly incorporated by reference at this point, and the documents cited therein.

Preferred diiminepalladium complexes are:

[bis-N,N'-(2,6-diisopropylphenyl)-1,4-diaza-2,3-dimethyl-1,3-butadiene](acetonitrile)methylpalladium tetrakis(3,5-bis(trifluoromethyl)phenyl)borate,

[bis-N,N'-(2,6-diisopropylphenyl)-1,4-diaza-2,3-dimethyl-1,3-butadiene](diethyl ether)methylpalladium tetrakis(3,5-bis(trifluoromethyl)phenyl)borate,

[bis-N,N'-(2,6-diisopropylphenyl)-1,4-diaza-2,3-dimethyl-1,3-butadiene]-$\eta^1$-O-methylcarboxypropylpalladium tetrakis(3,5-bis(trifluoromethyl)phenyl)borate,

[bis-N,N'-(2,6-diisopropylphenyl)-1,4-diaza-1,3-butadiene]-$\eta^1$-O-methylcarboxypropylpalladium tetrakis(3,5-bis(trifluoromethyl)phenyl)borate,

[bis-N,N'-(1-naphthyl)-1,4-diaza-2,3-dimethyl-1,3-butadiene]-$\eta^1$-O-methylcarboxypropylpalladium tetrakis(3,5-bis(trifluoromethyl)phenyl)borate,

[bis-N,N'-(2,6-diisopropylphenyl)-1,4-diaza-2,3-dimethyl-1,3-butadiene]methylpalladium chloride and

[bis-N,N'-(2,6-diisopropylphenyl)-1,4-diaza-1,3-butadiene] methylpalladium chloride.

In a further embodiment of the process of the present invention, zirconocene complexes can be used as catalysts for the polymerization of the olefin rubber. These compounds and their reparation are described, for example, in WO 00/22010, whose teachings are hereby expressly incorporated by reference at this point, and the documents cited therein.

Preferred zirconocene complexes are:
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis (tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)-zirconium dichloride,
dimethylsilanediylbis(3-tert-butyl-5-ethylcyclopentadienyl)-zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)-zirconium dichloride,
dimethylsilanediylbis(3-ethyl-5-isopropylcyclopentadienyl)-zirconium dichloride,
dimethylsilanediylbis(2-methylindenyl)zirconium dichloride,
dimethylsilanediylbis(2-methylbenzindenyl)zirconium dichloride,
dimethylsilanediylbis(2-ethylbenzindenyl)zirconium dichloride,
methylphenylsilanediylbis(2-ethylbenzindenyl)zirconium dichloride,
methylphenylsilanediylbis(2-methylbenzindenyl)zirconium dichloride,
diphenylsilanediylbis(2-methylbenzindenyl)zirconium dichloride,
diphenylsilanediylbis(2-ethylbenzindenyl)zirconium dichloride,
(2-isopropyl-4-(4-tert-butylphenyl)indenyl)(2-methyl-4-(4-tertbutylphenyl)indenyl)dimethylsilylzirconium dichloride and the corresponding dimethylzirconium compounds.

In a further embodiment of the process of the present invention, chelate complexes of Ti, Zr, Hf, V, Nb, Ta, Cr, Mo, W or the rare earth metals whose ligands are bound by two O atoms, two N atoms or one O atom and one N atom can be used as catalysts for the polymerization of the olefin rubber. These compounds and their preparation are described, for example, in WO 00/71593, whose teachings are hereby expressly incorporated by reference at this point, and the documents cited therein.

Preferred chelate complexes of this type are:
bis(2,2,6,6-tetramethylheptane-3,5-dionato)titanium(IV) diisopropoxide and
bis(2,2,6,6-tetramethylheptane-3,5-dionato)titanium(IV) dichloride.

It is also possible to use cocatalysts in the process of the resent invention; suitable cocatalysts are known. Preference is given to using a cocatalyst which contains no ionically bound halogen. Examples of suitable cocatalysts are open-chain or cyclic aluminoxane compounds such as methylaluminoxane (MAO), boranes, preferably phenylboranes substituted by fluorine or fluoroalkyl groups, e.g. tris (pentafluorophenyl)borane or borates such as tetrakis (pentafluorophenyl)borate with noncoordinating counterions, preferably N,N-dimethylanilinium. Further suitable cocatalysts include, inter alia, phosphines or phosphoranes.

The catalyst is generally used in a molar ratio to the unsaturated monomer of from 1:100 000 to 1:1000, based on the metal of the catalyst.

The molar ratio of catalyst to cocatalyst is generally from 1:0.01 to 1:10 000, in particular from 1:0.1 to 1:1000, and in the case of organoaluminum compounds as cocatalyst, preferably from 1:10 to 1:10 000, particularly preferably from 1:20 to 1:2000, in particular from 1:30 to 1:1000. In the case of boron compounds as cocatalyst, the molar ratio of catalyst to cocatalyst is preferably from 1:0.9 to 1:2.

The catalysts used in the process of the present invention can also be supported. As supports, it is possible to use, in particular, inorganic oxides, for example oxides of silicon, aluminum, titanium or a metal of main group I or II of the Periodic Table. Particularly preferred oxides are aluminum oxide, magnesium oxide and especially silicon oxide (silica gel). Such support substances usually have mean particle sizes of from 1 to 1000 μm, in particular from 5 to 200 μm.

Unsaturated monomers suitable for use in the process of the present invention are, in particular, aliphatic olefins. In addition, vinylaromatic monomers and acrylic acid, methacrylic acid or derivatives thereof can also be used as unsaturated monomers.

For the purposes of the present invention, aliphatic olefins are linear or branched hydrocarbons having from 2 to 26 carbon atoms and one, preferably terminal, double bond. Suitable α-olefins are, for example, ethene, propene, 1-butene, i-butene, 1-pentene, 3-methyl-1-pentene or 4-methyl-1-pentene, 1-hexene, 3-, 4- or 5-methyl-1-hexene, 1-heptene, 1-octene, 1-decene, 1-dodecene, 1-dodecadecene, 1-hexadecene and 1-eicosene.

In the homopolymerization of α-olefins in the process of the present invention, preference is given to using ethene and propene or 1-butene, i-butene, 1-pentene, 1-hexene or 1-octene.

In the copolymerization of α-olefins, it is possible to employ any binary, ternary or higher mixtures of the abovementioned α-olefins. Binary polymerization mixtures can comprise, for example, ethene and propene, 1-butene, i-butene, 1-pentene, 1-hexene or 1-octene as starting monomers. Binary mixtures based on propene and 1-butene, i-butene, 1-pentene or 1-hexene and mixtures of 1-butene with i-butene, 1-pentene or 1-hexene are likewise suitable.

Particularly useful binary starting mixtures are ethene/propene, ethene/1-butene, ethene/1-pentene, ethene/1-hexene and 1-octenes.

Suitable ternary starting mixtures comprise, for example, ethene and propene together with 1-butene, i-butene, 1-pentene, 1-hexene or 1-octene. Mixtures of ethene and 1-butene and, as third comonomer, 1-pentene, 1-hexene or 1-octene are likewise suitable. Preferred ternary α-olefin mixtures are mixtures comprising ethene, propene and 1-butene and mixtures comprising ethene, propene and 1-hexene.

The abovementioned aliphatic olefins can also be used as mixtures with other monomers containing two or more conjugated or nonconjugated double bonds. The content of other monomers in these mixtures, based on the total mass of aliphatic olefins, can be up to 50% by weight, preferably up to 15% by weight, particularly preferably up to 10% by weight, in particular up to 7% by weight. Examples of such other monomers are butadiene, isoprene, 2,3-dimethylbutadiene, 1,3-pentadiene, 1,3-hexadiene, 1,4-hexadiene, 1,5-hexadiene, dicyclopentadiene, norbornene, piperylene, cyclodienes such as 1,5-cyclooctadiene and mixtures thereof. As other monomers in these mixtures, preference is given to dienes having nonconjugated double bonds; in these cases, one double bond is utilized for polymerization into the olefin rubber while the second double bond is retained for any grafting reacting desired in a later process step.

Examples of vinylaromatic monomers suitable for use in the process of the present-invention are styrene, α-methylstyrene, p-methylstyrene, ethylstyrene, tert-butylstyrene, vinyltoluene and 1,1-diphenylethylene and mixtures thereof. Particular preference is given to styrene.

Further suitable unsaturated monomers are, inter alia, acrylic acid, methacrylic acid and their derivatives, in particular their anhydrides, amides, nitriles or their esters. Particular mention may be made of the esters of acrylic acid or of methacrylic acid with $C_1$-$C_{30}$-alcohols, preferably n-butyl acrylate, isobutyl acrylate, ethyl acrylate, ethylhexyl acrylate, methyl acrylate, methyl methacrylate and n-butyl methacrylate, and also mixtures of such monomers.

The monomers used in the process of the present invention preferably have a boiling point of less than 100° C., particularly preferably less than 70° C. and in particular less than 40° C.

In the process of the present invention, the polymers obtained by polymerization in the presence of suitable catalysts are swollen with the total amount or part of the unreacted residual monomers. The proportion of residual monomers which have not been removed and in which the polymers are swollen is preferably more than 2% by weight, more preferably more than 5% by weight, in particular more than 10% by weight, based on the amount of the polymer. The presence of the unpolymerized residual monomers results in, inter alia, a reduction in the viscosity of the polymer obtained.

The polymerization of the unsaturated monomers can be carried out either in these monomers themselves or else in a mixture of these monomers with suitable solvents. Suitable solvents include aliphatic, cycloaliphatic or aromatic hydrocarbons having from 4 to 12 carbon atoms, e.g. pentane, hexane, heptane, cyclohexane, methylcyclohexane, isooctane, benzene, alkylbenzenes such as toluene, xylene or ethylbenzene or decalin or suitable mixtures. If a further solvent component is used, the proportion of unsaturated monomers in the total amount of solvent is generally in the range from 80 to 100% by weight, preferably from 85 to 100% by weight.

The polymerization is preferably carried out at from 0 to 150° C., in particular from 10 to 120° C. The polymerization can also be controlled by means of suitable regulators, for example by means of hydrogen or by means of an aluminum hydride such as dibutylaluminum hydride.

Subsequent to the preparation of the polymers which are swollen with the total amount or part of the unreacted residual monomers, the swollen polymer obtained is, in the last step of the process of the present invention, admixed with surface-active substances and water, with the polymers obtained not being separated completely from the residual monomers even in the final step.

Suitable surface-active substances include protective colloids and especially emulsifiers, which are preferably used.

As emulsifiers, it is possible to use, for example, alkali metal salts of relatively long-chain fatty acids, alkyl sulfates, alkylsulfonates, alkylated arylsulfonates or alkylated biphenyl ether sulfonates. Further possible emulsifiers are reaction products of alkylene oxides, in particular ethylene oxide or propylene oxide, with fatty alcohols, fatty acids or phenol or alkylphenols. Based on the amount of polymer, preference is given to using from 0.1 to 30% by weight, in particular from 0.3 to 25% by weight, of these substances.

In the last step too, the polymers obtained are not separated completely from the residual monomers, i.e. the proportion of residual monomers which have not been removed based on the amount of the polymer is still more than 2% by weight, in particular more than 5% by weight, very particularly preferably more than 10% by weight.

The preparation of the polymer dispersion can in principle be carried out in one or more steps. It can be advisable to prepare the polymer dispersion with the aid of mechanical shear. This makes it possible to set the particle size of the polymer dispersion appropriately.

Such polymer dispersions usually have mean particle sizes (weight average $d_{50}$) of from 0.01 to 5000 μm, preferably less than 1000 μm, in particular less than 100 μm. The weight average $d_{50}$ is the diameter at which 50% by weight of the particles have a diameter above this value and 50% by weight of the particles have a diameter below this value.

The mechanical shear can be applied, inter alia, with the aid of an Ultraturrax, with the aid of a fast-running stirrer or by means of an ultrasonic probe.

It is also possible to carry out the first step for preparing the polymer dispersion in the presence of a suitable ultrasonic device (Ultraturrax, ultrasonic probe) or a fast-running stirrer and then to use a high-pressure homogenizer in a second step.

The glass transition temperature of the resulting polymers of unsaturated monomers is usually in the range from −100 to +100° C., in particular in the range from −90 to +80° C.

Furthermore, the process of the present invention can be modified so that the resulting polymers of unsaturated monomers are subjected to a second polymerization step in which further monomers are grafted onto the polymers. Such further monomers which are grafted onto the polymers can be added to the polymers before, during or after the point in time at which the swollen polymer obtained is admixed with surface-active substances and water. The further monomers are preferably added before this point in time, with the further monomers added in the second step then also being able to function as solvents.

Suitable further monomers which can be grafted onto the polymer are, in particular, vinylaromatic monomers, acrylonitrile or else acrylic acid, methacrylic acid and their derivatives.

Vinylaromatic monomers which are suitable for use in the process of the present invention are, for example, styrene, α-methylstyrene, p-methylstyrene, ethylstyrene, tert-butylstyrene, vinyltoluene or 1,1-diphenylethylene or mixtures thereof. Particular preference is given to styrene and α-methylstyrene.

Further monomers which can be used are, inter alia, acrylic acid, methacrylic acid and their derivatives, in particular their anhydrides, amides, nitrites or their esters. Particular mention may be made of the esters of acrylic acid or of methacrylic acid with $C_1$-$C_{30}$-alcohols, preferably n-butyl acrylate, isobutyl acrylate, ethyl acrylate, ethylhexyl acrylate, methyl acrylate, methyl methacrylate and n-butyl methacrylate and also mixtures of such monomers. Further suitable compounds are, in particular, glycidyl acrylate, glycidyl methacrylate, acrylamide and methacrylamide.

The further monomers which are grafted onto the polymer have, like the unsaturated monomers of the first polymerization step, the task of, inter alia, reducing the viscosity of the polymers. The further monomers can be present during the formation of the polymers or else can be added after the polymerization is complete. If the monomers are present during the formation of the polymers, they aid the dispersion of the polymers in the solution. The further monomers can also be copolymerized. It is advisable to add these further monomers to the polymer for the purpose of grafting at a point in time at which the unsaturated monomers have not yet been removed.

If the polymer particles obtainable from the aqueous polymer dispersion are to serve as impact modifiers, it is advisable to use styrene, acrylonitrile or methyl methacrylate as further monomers (grafting monomers). If the aqueous polymer dispersions are to be used as surface coatings, it is advantageous to provide them with suitable crosslinkers, for example acrylamide-N-alkylols, methacrylamide-N-alkylols, e.g. acrylamidemethylol methyl ether, N-methylolacrylamide, methacrylamide methylol methyl ether, butadiene, isoprene, dicyclopentadiene or butanediol diacrylate. In addition, anhydride groups or acidic epoxy groups which can be crosslinked by means of cations such as $Ca^{2+}$ or $Mg^{2+}$ are also suitable for this purpose.

Like the unsaturated monomers, the further monomers (grafting monomers) can also be used for, firstly, reducing the viscosity of the polymers obtained and, secondly, obtaining smaller particle sizes.

Based on the total amount of unsaturated monomers and grafting monomers, the amount of grafting monomers is usually in the range from 0 to 90% by weight, in particular in the range from 0 to 60% by weight and particularly preferably in the range from 0 to 50% by weight.

The grafting reaction is usually carried out by a free-radical mechanism. The free-radical polymerization can be initiated either thermally, for example in the case of styrene, or with the aid of suitable free-radical initiators.

Possible-free-radical initiators are peroxides, for example diacyl peroxides, dialkyl peroxides, diaryl peroxides, peroxyesters, peroxydicarbonates, peroxyketals, peroxosulfates, hydroperoxides or azo compounds. Preference is given to using dibenzoyl peroxide, 1,1-di-tert-butylperoxycyclohexane, dicumyl peroxide, dilauryl peroxide, azobisisobutyronitrile and also sodium, potassium and ammonium persulfates.

As auxiliaries, it is possible to add molecular weight regulators such as dimeric α-methylstyrene, mercaptans such as n-dodecyl mercaptan or tert-dodecyl mercaptan, chain branching agents, stabilizers or mold release agents.

The grafting reaction is usually carried out at from 5 to 150° C., in particular from 10 to 100° C., particularly preferably from 20 to 90° C.

During swelling and the addition of the surface-active substances, it is advisable to set temperatures of from 0 to 300° C., in particular from 10 to 250° C. and particularly preferably from 20 to 220° C.

To convert the polymers together with the monomers into a stable dispersion, it its possible to use customary apparatuses such as rotor-stator machines (Ultraturrax or Disparx from IKA, Stauffen), similar apparatuses from the companies Cavitron or Supaton, or else apparatuses as described in U.S. Pat. No. 5,816,700. Furthermore, intensively mixing in-line mixers, fast-running single-screw mixers having different mixing and transport zones (DE-A 3903007) or else corotating twin-screw machines and also high-pressure homogenizers are suitable for this purpose.

The process of the present invention can also be carried out so that the pressure after dispersion of the polymers in water is complete is similar to that prior to dispersion. It can also be advisable to add the further monomers which are grafted onto the polymer before the point in time at which the swollen polymer obtained is admixed with surface-active substances and water.

Furthermore, the swollen polymer obtained after the process of the present invention can be admixed with surface-active substances and also further polymers, fillers, auxiliaries and pigments together with water.

It is also possible, in addition, to add compatibilizers which alter the morphology between the polymers and the monomers grafted onto them to the aqueous polymer dispersion. The compatibilizers can also have a favorable effect on the distribution and morphology of the further polymers, fillers, auxiliaries and pigments.

The process of the present invention can be carried out readily without a great outlay and makes it possible to prepare, inter alia, polymer dispersions having a small particle size. Furthermore, it is particularly suitable for preparing aqueous dispersions of polyolefins which can otherwise be obtained only with great difficulty.

The aqueous polymer dispersions obtained by the process of the present invention, which are likewise provided by the present invention, preferably have a mean particle size (weight average $d_{50}$) of from 0.01 to 20 μm, in particular from 0.03 to 15 μm and particularly preferably less than 5 μm. If they are used as films or impact modifiers, they preferably have mean particle sizes of less than 2 μm, in particular mean particle sizes of less than 1 μm.

The particle size can be determined by light scattering methods. An overview may be found in D. Distler (editor) "Wäßrige Polymerdispersionen", Wiley-VCH, $1^{st}$ Edition, 1999, Chapter 4.

The aqueous polymer dispersions of the present invention particularly preferably comprise copolymers of ethylene as polymers.

The aqueous dispersions prepared according to the present invention can be used advantageously in numerous applications, for example paper applications such as paper coating or surface sizing, also paints and varnishes, building chemicals, adhesives raw materials, molded foams, textile and leather treatments, coatings for the back of carpets, mattresses or pharmaceutical applications. The polymer dispersions obtained can also be used as matting agents. It is also possible to use the polymer dispersion obtained together with other polymers.

EXAMPLE

A. Preparation of an Ethene-Propene Solution Polymer 10 mg of bis(n-butylcyclopentadienyl)zirconium dichloride were dissolved in 10 ml of water- and oxygen-free toluene (from Aldrich) under argon in a Schlenk tube and admixed at room temperature with 16 ml of MAO solution (methylaluminoxane, 10% in toluene, from Aldrich) and the mixture was stirred for 5 minutes.

A baked stainless steel autoclave (0.3 l) which was provided with electric heating and a mechanical stirrer and had been flushed with inert gas was charged at room temperature with 30 g of propene. It was then pressurized with ethene to a pressure of 20 bar. After the mixture had been stirred for 5 minutes, the catalyst solution was introduced into the autoclave over a period of 2 minutes by means of an HPLC pump. The mixture was heated to 50° C. and, after 2 hours, cooled to room temperature. On depressurization to atmospheric pressure, a viscous polymer which was still swollen with propene was obtained.

B. Preparation of a polyethylene-co-propylene Dispersion

The swollen copolymer obtained from step A was transferred to a 500 ml flask provided with an Ultraturrax. At room temperature, a mixture of 100 ml of water and 6 g of Disponil FES 77 (emulsifier from Henkel) was added thereto over a period of 10 minutes while stirring vigorously. The particle size of the suspension formed was measured under an optical microscope and was about 10 μm. The suspension was then homogenized three times by means of a high-pressure homogenizer (model NS 1001 L Panda from Niro Soavi) at room temperature. This gave a white dispersion having a solids content of 13%. The mean particle size of the copolymer dispersion was determined as 220 nm by dynamic light scattering. Filtration of the dispersion through a 45 μm woven filter gave a coagulum content of 0.2%. The dispersion is stable for weeks without separation of a cream layer and without settling.

C. Preparation of a Polypropylene Dispersion 5 mg of the zirconium complex 1 (preparation: B. Rieger et al., Z. Naturforsch., Part B 1994, 49, 451) were dissolved in 5 ml of a solution of MAO in toluene (methylaluminoxane, 10%, from Aldrich GmbH) at room temperature under argon in a Schlenk tube and the mixture was stirred at 20° C. for 5 minutes.

A baked stainless steel autoclave (1.2 l) which was provided with electric heating, an oil-filled heating/cooling jacket and a mechanical stirrer and had been flushed with inert gas was charged at room temperature with 200 g of propene and 200 g of isobutane. After the mixture had been heated to 40° C., the catalyst solution was metered into the autoclave by means of an HPLC pump over a period of 1 minute. After 5 hours at 40° C., the reaction was stopped by pressurization with carbon dioxide to 20 bar.

A solution of 25 g of n-dodecylbenzenesulfonate sodium salt and 100 g of Disponil FES 77 (30% in water, from Cognis) in 500 g of water was placed in a second stirred vessel made of steel (2.5 l) and provided with a mechanical stirrer and the mixture was heated to 80° C. The polypropylene solution was pushed by means of nitrogen pressure via a riser tube into the larger stirred vessel and was emulsified at 2000 rpm. A fine emulsion was prepared from the coarse emulsion by passing the latter sequentially through a dynamic mixer (15 000 rpm, model MT5000, from Kinematica) and a high-pressure homogenizer at 80° C. (model NS 1001 L Panda from Niro Soavi) and the fine emulsion was passed into a steel vessel (5 l). After depressurization of the mixture to atmospheric pressure, the dispersion was freed of residual isobutane by passing nitrogen into it via a built-in frit.

This gave a dispersion having a solids content of 23%. The mean particle diameter was 290 nm. Drying of 5 g of dispersion at room temperature in a polyethylene dish gave an elastic polypropylene film. The mass average molecular weight of the dried film determined by GPC was 180 000 g/mol (polydispersity: 1.9).

We claim:

1. A process for preparing an aqueous polymer dispersion having a mean particle size (D50 weight average) of from 0.01 to 20 μm, comprises:
   polymerizing in the absence of solvent an unsaturated monomer in the presence of a suitable catalyst in such a way that the polymers obtained are swollen with more than 2% by weight, based on the amount of polymer, of unreacted residual monomers and
   dispersing these polymers with a surface-active substance and water in a subsequent step,
   wherein the polymers obtained are not being separated completely from the residual monomers.

2. A process as claimed in claim 1, wherein said unsaturated monomer has a boiling point of less than 100° C.

3. A process as claimed in claim 1, wherein said unsaturated monomer is an aliphatic olefin.

4. A process as claimed in claim 1, wherein said unsaturated monomer is acrylic acid, methacrylic acid or derivatives thereof.

5. A process as claimed in any of claim 1, wherein the aqueous polymer dispersion is subjected to mechanical shear during or after swelling.

6. A process as claimed in claim 1, wherein the preparation of the polymers is carried out with the aid of an organometallic compound.

7. A process as claimed in claim 1, wherein the polymers obtained are subjected to a further polymerization step in which at least one further monomer is grafted onto the polymers.

8. A process as claimed in claim 7, wherein the further monomers which are grafted onto the polymer are added before the point in time at which the swollen polymer obtained is admixed with the surface-active substance and water.

9. A process as claimed in claim 1, wherein the swollen polymer obtained is admixed with the surface-active substance and further polymers, fillers, auxiliaries and pigments together with water.

10. A process as claimed in claim 7, wherein the swollen polymer obtained is admixed with the surface-active substance and also a compatibilizer which improves the morphology between the polymers and other substances which are likewise added together with water.

11. A process as claimed in claim 7, wherein a compatibilizer which alters the morphology between the polymers obtained and the monomers grafted onto it is chosen.

12. A process as claimed in claim 7, wherein said further monomer is at least one monomer selected from the group consisting of vinylaromatic monomers, acrylonitrile and methyl methacrylate.

13. A process as claimed in claim 10, wherein the compatibilizer is added either before or during the point in time at which the swollen polymer.

14. A process as claimed in claim 1, wherein said polymerizing an unsaturated monomer is conducted in the absence of a surface-active substance.

15. A process as claimed in claim 1, wherein the polymers obtained are swollen with more than 5% by weight, based on the amount of polymer, of unreacted residual monomers.

16. A process as claimed in claim 1, wherein the polymers obtained are swollen with more than 10% by weight, based on the amount of polymer, of unreacted residual monomers.

* * * * *

UNITED STATES PATENT AND TRADEMARK OFFICE
CERTIFICATE OF CORRECTION

| | | |
|---|---|---|
| PATENT NO. | : 7,601,777 B2 | Page 1 of 1 |
| APPLICATION NO. | : 10/516135 | |
| DATED | : October 13, 2009 | |
| INVENTOR(S) | : Mc Kee et al. | |

It is certified that error appears in the above-identified patent and that said Letters Patent is hereby corrected as shown below:

On the title page, Item (30), the Foreign Application Priority Data is incorrect. Item (30) should read:

-- (30)    Foreign Application Priority Data

Jun. 21, 2002   (DE)...................................... 102 27 901.2
Aug. 28, 2002   (DE)...................................... 102 40 188.8 --

Signed and Sealed this

Twenty-fourth Day of November, 2009

David J. Kappos
*Director of the United States Patent and Trademark Office*